United States Patent
Ravi et al.

(10) Patent No.: US 6,832,651 B2
(45) Date of Patent: Dec. 21, 2004

(54) CEMENT COMPOSITION EXHIBITING IMPROVED RESILIENCE/TOUGHNESS AND METHOD FOR USING SAME

(75) Inventors: Krishna M. Ravi, Kingwood, TX (US); B. Raghava Reddy, Duncan, OK (US); Rickey L. Morgan, Comanche, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 120 days.

(21) Appl. No.: 10/230,782

(22) Filed: Aug. 29, 2002

(65) Prior Publication Data

US 2004/0040712 A1 Mar. 4, 2004

(51) Int. Cl.$^7$ ............................................. E21B 33/13
(52) U.S. Cl. ....................................... 166/292; 106/718
(58) Field of Search ................................ 106/285, 292, 106/73, 718, 724; 507/200

(56) References Cited

U.S. PATENT DOCUMENTS

| | | | |
|---|---|---|---|
| 4,557,763 A | 12/1985 | George et al. ................ | 106/90 |
| 5,135,577 A | 8/1992 | Brothers .................... | 106/724 |
| 5,159,980 A | 11/1992 | Onan et al. ................. | 166/294 |
| 5,293,938 A | 3/1994 | Onan et al. ................. | 166/293 |
| 5,401,786 A * | 3/1995 | Gopalkrishnan .............. | 524/5 |
| 5,588,488 A | 12/1996 | Vijn et al. .................. | 166/293 |
| 5,688,844 A | 11/1997 | Chatterji et al. ............. | 524/8 |
| 5,738,463 A | 4/1998 | Onan ....................... | 405/154 |
| 5,795,924 A | 8/1998 | Chatterji et al. ............. | 523/130 |
| 5,820,670 A | 10/1998 | Chatterji et al. ............. | 106/727 |
| 5,913,364 A | 6/1999 | Sweatman ................... | 166/281 |
| 5,945,387 A | 8/1999 | Chatterji et al. ............. | 507/224 |
| 5,964,293 A | 10/1999 | Chatterji et al. ............. | 166/294 |
| 6,098,711 A | 8/2000 | Chatterji et al. ............. | 166/294 |
| 6,167,967 B1 | 1/2001 | Sweatman ................... | 166/281 |
| 6,234,251 B1 | 5/2001 | Chatterji et al. ............. | 166/295 |
| 6,258,757 B1 | 7/2001 | Sweatman et al. ........... | 507/219 |
| 6,271,181 B1 | 8/2001 | Chatterji et al. ............. | 507/219 |
| 6,328,106 B1 | 12/2001 | Griffith et al. .............. | 166/295 |
| 6,330,917 B2 | 12/2001 | Chatterji et al. ............. | 166/295 |
| 6,398,865 B1 * | 6/2002 | Morita et al. ............... | 106/806 |
| 6,641,660 B1 * | 11/2003 | Chatterji et al. ............. | 106/724 |
| 2002/0033263 A1 * | 3/2002 | Chatterji et al. ............. | 166/292 |

OTHER PUBLICATIONS

"Encyclopedia of Polymer Science and Engineering," vol. 2, pp. 324–434, 1985.

* cited by examiner

Primary Examiner—William Neuder
(74) Attorney, Agent, or Firm—Craig W. Roddy; Baker Botts L.L.P.

(57) ABSTRACT

A cement composition for use in borehole applications comprising hydraulic cement, sufficient water to form a slurry, and an effective amount of a resilience/toughness enhancing additive comprising a thermoplastic block copolymer having a tensile strength of from 500 to 4000 psi, a recoverable elongation of 200 to 1000 percent and exhibiting temperature stability in the range of 30° to 500° F., the cement composition being useful for forming seals at desired locations in wellbores or formations penetrated by wellbores by placing the composition in the desired location and permitting the composition to set.

25 Claims, No Drawings

CEMENT COMPOSITION EXHIBITING IMPROVED RESILIENCE/TOUGHNESS AND METHOD FOR USING SAME

FIELD OF THE INVENTION

The present invention relates to a cementious composition used for oil and gas well cementing and a method of cementing an oil or gas well. More particularly, the present invention relates to a cementious composition that exhibits improved resilience/toughness.

DESCRIPTION OF THE PRIOR ART

Hydraulic cement compositions are utilized for carrying out a variety of operations in oil, gas, and water wells, including, but not limiting to, completion operations, such as primary cementing, and remedial operations, such as squeeze cementing. Primary cementing involves the placement of a hydraulic cement composition into the annular space between the walls of a wellbore and the exterior of a pipe, such as a casing disposed therein. The cement composition is pumped into the annular space and allowed to set into an annular cement sheath therein whereby the pipe, e.g., casing, is bonded to the walls of the wellbore by the set cement. In addition to bonding the pipe to the walls of the wellbore, the set cement prevents the undesirable flow of fluids into and through the annular space.

Squeeze cementing techniques usually involve the method of preventing undesirable movement of oil, gas, or water through small holes or cracks in pipes disposed in the wellbore; holes, cracks, voids, or channels in the annular cement sheath between the pipe and the wellbore; or annular spaces between the cement sheath and the pipe or walls of the wellbore in permeable zones or fractures in subterranean formations. Such holes, cracks, etc., are plugged by squeezing hydraulic sealant compositions such as cement therein which harden and form impermeable plugs.

Over the years, the exploration for oil and gas wells has moved to more challenging environments, which involve high pressures, high temperatures, deep water, etc. These extreme conditions lead to many problems in connection with cement compositions heretofore used in either primary cementing or remedial operations such as squeeze cementing. For example, it is not uncommon for the formation or reservoir to subside as the hydrocarbon is withdrawn from the reservoir. Additionally, there can also be movement of the area surrounding the formation toward the wellbore due to the tectonic forces or due to its plasticity. Furthermore, during well construction and production, the cement in the annulus, particularly in harsh environments, is subjected to changes in pressure and temperature from operations such as swapping of wellbore fluid, perforation, stimulation, production, injection, and shutdown.

Thus, the combination of the extreme environmental conditions, moving reservoir, and operations typically performed on the well generate stresses in the annular cement sheath between the pipe, e.g., casing, and the wellbore. When the integrity of the cement sheath is compromised, several scenarios, all of which are undesirable, can result. In a worse-case scenario, the wellbore can collapse, shutting off production until remedial work is done, and in many cases, this solution is cost-prohibitive.

Even in the absence of complete wellbore collapse, loss of integrity of the cement sheath in the annulus can lead to other undesirable scenarios as for example low to negligible pressure on the wellhead; loss of hydrocarbon due to water in the producing zone and/or hydrocarbon entering a thief zone, etc.

SUMMARY OF THE INVENTION

Compositions useful in the present invention comprise a hydraulic cement, sufficient water to form a slurry, and an effective amount of a uniformly dispersed resilience/toughness enhancing additive comprising a thermoplastic block copolymer having a tensile strength from 500 to 4000 psi, a recoverable elongation of 200 to 1000 percent and temperature stability in the range of 30 to 500° F.

According to a method of the present invention, a seal can be formed in a wellbore or in one or more subterranean formations penetrated by the wellbore by placing a composition comprising a mixture of a slurry of a hydraulic cement and an effective amount of a generally uniformly dispersed resilience/toughness enhancing additive comprising a thermoplastic block copolymer in one or more of the subterranean formations or in the wellbore at a desired location. Once in position, the hydraulic cement containing the resilience/toughness enhancing additive is permitted to set to form in the location a plug or seal, the plug or seal comprising a hardened cement containing a generally uniform dispersion of the resilience/toughness enhancing additive. The block copolymer has a tensile strength of from 500 to 4000 psi, recoverable elongation of 200 to 1000 percent and exhibits temperature stability in the range of 30 to 500° F.

DETAILED DESCRIPTION OF PREFERRED EMBODIMENTS

The present invention is buttressed on the finding that by incorporating into a typical hydraulic cement slurry, certain uniformly dispersed polymeric materials, the set cement exhibits increased ductility and resilience/toughness and therefore enhanced integrity. As is well known to those skilled in the art, resilience is the energy needed to yield a sample while toughness is the amount of energy needed to break a sample. Accordingly, a material that is only strong but exhibits negligible elongation capability before breaking is brittle. Obviously material that is resilient/tough is capable of greater energy absorption than a brittle material. Accordingly, to enhance the resilience/toughness of a given composition, e.g., a set hydraulic cement, it is necessary to incorporate a material that is strong, but at the same time that can stretch or deform and can dissipate energy in a fashion which doesn't result in breakage but which does not adversely affect other properties.

Portland cements of the type used in forming plugs, seals and sheaths in downhole oil and gas operations exhibit high compressive strength and hence are strong. However, such cements are also brittle, have low tensile strength, limited ability to deform and are not tough. Because of these characteristics, it is not uncommon in borehole environments for the cement seal or sheath to exhibit tensile cracking, debonding at the cement/casing interface, debonding at the cement/borehole interface, and/or non-linear or non-recoverable plastic collapse.

As compared to a typical "neat" hydraulic cement, a more ideal hydraulic cement, i.e., "modified" hydraulic cement, would have a lower Young's modulus, have similar compressive strength, have higher recoverable elongation, exhibit higher resilience/toughness or fracture energy, and would be more ductile.

The compositions and methods of the present invention are particularly suitable for providing primary bonding between casing and/or liners disposed in wellbores and the walls of the wellbores, particularly where the casing or liners are subsequently subjected to high temperature and pressure differentials.

Primary cementing has heretofore been carried out by pumping a cement slurry downwardly through the casing or the liner and then upwardly into the annulus between the external surface of the casing or liner and the walls of the wellbore. After placement of the cement in the annulus, it is allowed to set into a hardened permeable mass. The cement provides a bond between the casing or liner and the walls of the wellbore to thereby maintain the casing or liner in place and prevent communication between zones or formations which are penetrated by the wellbore via the annulus.

In certain wells, particularly where excessive flowing or steam injection temperatures exist at the surface or where fluid pressures are exerted within the conduit, failures in the cement in the form of cracks or fractures have been experienced. Such failures allow fluids to flow through the annulus from one formation to another or to the surface causing loss of production and the existence of dangerous conditions. The problem is particularly severe in hot, deep wells or geothermal wells where the produced fluids flow through the wellbore at a high temperature and where high fluid pressures are exerted on the cemented conduit during simulation and test procedures. The conduit expands in the presence of high temperatures and internal pressures and could cause de-bonding at the cement-casing and/or cement-formation interface and/or cracking of the cement sheath and cause zonal isolation failure.

The compositions and methods of the present invention substantially reduce the above-described problems by sealing the annulus between the wellbore and a conduit disposed therein with a dual state composite comprised of a hardened cement and a thermoplastic block copolymer. Thus, in accordance with the composition and the method of the present invention for sealing a conduit in a wellbore, a composition comprising a mixture of a slurry of a hydraulic cement and a uniformly dispersed thermoplastic block copolymer is pumped downwardly through the conduit and upwardly to a desired location in the annulus between the conduit and the wellbore wherein the hydraulic cement is allowed to set. The presence of the thermoplastic block copolymer gives the set cement a lower Young's modulis, higher recoverable elongation, greater resilience/toughness, more ductility, all without unduly compromising the compressive strength. This composite seal more effectively bonds the external surfaces of the conduit to the walls of the wellbore whereby fluid migration in the annulus is prevented. Because the composite seal has elasticity and resilience, expansion of the conduit due to high temperatures and pressures exerted thereon does not cause the failure of the composite seal or diminish sealing and bonding properties.

The methods of the present invention are particularly suitable for performing a variety of well completion and remedial operations in subterranean formation and the wellbores penetrating such formations. For example, the methods of the present invention are particularly suitable for performing squeeze remedial operations wherein the sealant is forced into cracks and/or voids to provide a seal therein. Other operations in which the methods are particularly suitable include, but are not limited to, consolidated gravel packs or incompetent formations exposed to high temperatures and pressures, forming temporary or permanent plugs or packers in wellbores including horizontal wellbores, forming lightweight floatation barriers above liquid hydrocarbons in caverns and the like.

The methods of the present invention for forming temporary or permanent plugs or seals in a wellbore or in one or more subterranean formations penetrated by the wellbore generally comprises the steps of placing a slurry of the hydraulic cement and the thermoplastic block copolymer in the subterranean formation or in the wellbore penetrating the formations at a desired location therein and allowing the cement to set to form the dual state composite of set cement uniformly dispersed thermoplastic block copolymer.

The terms "well completion methods" or "well completion operations" are used herein to mean any of the operations utilized for completing the preparation of a well for hydrocarbon production after it has been drilled including the primary cementing of casing and liners in the wellbore, placing lightweight floatation barriers over recovered liquid hydrocarbon, consolidating gravel packs, or incompetent sands and formations and the like. The terms "remedial methods" or "remedial operations" are used herein to mean procedures carried out in subterranean formations or in wellbores penetrating the formations to correct problems such as sealing cracks or voids, placing plugs in the wellbore or in zones or formations containing undesirable fluids, placing temporary plugs in lieu of packers to isolate zones or formations, filling external casing packers and the like.

As used herein, the term hydraulic cement is intended to mean all inorganic cementious materials of known type which comprise compounds of calcium, aluminum, silicon, oxygen and/or sulphur which exhibit "hydraulic activity", that is, which set solid and harden in the presence of water. Hydraulic cements useful herein include, but are not limited to, Portland cement, fast setting or extra fast setting, sulphate resistant cement, modified cements, alumina cements, calcium aluminate cements, fly ash cements, silica fume and lime cements, and slag cements. Cements can also include small particle size cement or ultrafine cement.

In addition to the hydraulic cement, the compositions of the present invention include water which can come from virtually any source, provided that it does not contain an excess of compounds which adversely react with or otherwise affect other components of the compositions. The water is present in the composition in an amount sufficient to form a slurry of the cement, preferably a slurry which is pumpable, i.e., has a viscosity and other properties of appropriate magnitude to enable it to be pumped to a desired location. Generally, the water is present in the range from about 30 percent to about 60 percent by weight of dry cement in the composition when the cement is of normal particle size. In some cases, the water percentage could be higher. Additionally, a dispersing agent such as the dispersing agent disclosed in U.S. Pat. No. 4,557,763 is generally included to facilitate the formation of the cement slurry and prevent premature gelation thereof.

The resilience/toughness enhancing additives useful in the composition and methods of the present invention include a wide variety of thermoplastic block copolymers. As noted above, generally speaking the thermoplastic block copolymers which are useful in the present invention should have a tensile strength by itself in the range of 500 to 4000 psi, recoverable elongation of 200 to 1000 percent and should be stable in the temperature range of from 30° F. to 500° F. A typical block polymer is made up of alternating sections of one chemical composition separated by sections of a different chemical composition or by a coupling group of low molecular weight. Depending on the number of blocks in the polymer, the polymer is designated as block or tri-block. The block polymers may be linear or branched. When the blocks are coupled by a junction atom such as silicon, the resulting branched polymers are referred to as star-block or radial-block copolymers. The number of arms in a star- or radial-block polymer depends on the valency of the junction atom. Thus, for example, when silicon is the junction atom four arms are connected in a cruciform, and when aluminum is the junction atom, the resulting block polymer molecule will have three arms. For example, block polymers can have the structure (A-b-B-b-A) wherein A represents a block which is glassy or semi-crystalline and B a block which is elastomeric, and wherein the relative properties of the segments are such that A is a discrete phase and B is a continuous phase. In principle, A can be any polymer that is normally regarded as thermoplastic as for example polystyrene, poly(methacrylate), isotactic polypropylene, polyurethane, etc., and B can be any polymer that is normally regarded as elastomeric as for example polyisoprene, polybutadiene, polyisobutylene, polyethers, polyesters, etc. The block polymer of particular interest are thermoplastic elastomers but differ from conventional elastomers in that they soften and flow at elevated temperatures. For additional information regarding block polymers in general as well as of the type useful in the present invention, reference is made to "Encyclopedia of Polymer Science and Engineering", Volume 2, pages 324–434.

Other copolymers that can be employed as the resilience/toughness enhancing additive include block copolymers of various olefins as for example ethylene/propylene copolymers wherein the ethylene block segments are generally considered elastomeric in nature and the polypropylene segments are generally considered semi-crystalline.

Particularly desirable thermoplastic block elastomeric copolymers useful herein have a so-called radial type structure, especially such polymers having a thermoplastic portion derived from substituted or unsubstituted styrene and an elastomeric portion derived from butadiene isoprene, or a combination of ethylene and butadiene. The final polymer may be hydrogenated, if necessary, to remove or reduce any remaining unsaturation in the polymer chain. Non-limiting examples of commercially available block polymers suitable for use in the compositions and methods of the present invention are marketed by Shell Chemicals under the name Kraton®, Kraton G®; by Elf Sta Fina under the name Finaprene® and; by Phillips Corporation under the name Bina BL, etc. Thermoplastic elastomers which are non-styrenic in nature but useful in the present invention include polyolefinic block copolymers marketed by Uniroyal Corporation under the name TPR (polyolefins); from Dupont under the names Somel® (polyolefins), and Hytrel® (polyester-polyether); and from Atochem under the name Pebax® (polyamide polyether).

It will be appreciated that the arrangement of the block copolymer segments, the molecular weights of the block copolymers, the molecular weight distribution, the relative proportion of the two types of segments present in the block copolymers and the nature of any linking segments of a block influence the physical properties and behavior of the resulting thermoplastic block copolymers. Accordingly, virtually any thermoplastic elastomeric block copolymer can be used provided that it meets the criteria discussed above with respect to tensile strength, recoverable elongation and temperature stability; is compatible with the hydraulic cement and does not deleteriously affect the set cement, i.e., reduce compressive strength to an unacceptable level. The resilience/toughness enhancing additives of the present invention are generally in the form of powders and are added as such to the hydraulic cement slurry albeit that they can be added to the water which forms the slurry and then added to the cement. In order to uniformly disperse the resilience/toughness enhancing additive in the hydraulic cement, techniques well known to those skilled in the art in preparation of hydraulic cement formulations can be employed.

Generally speaking, the thermoplastic elastomers of the present invention will be present in the hydraulic cement compositions in an amount of up to about 50%, more preferably from about 5% to about 30%, especially from about 5% to about 20%, all based on percentage by weight of the cement.

It is to be understood that the thermoplastic copolymers of the present invention are to be distinguished from the latex compositions used in the methods and compositions set forth in U.S. Pat. No. 5,293,938, incorporated herein by reference for all purposes. Indeed, it is a feature of the present invention that the thermoplastic block copolymer utilized in the compositions and methods do not require any vulcanization or any other further chemical reaction once the dual state composite slurry has been placed in the desired location.

To more fully illustrate the present invention, the following non-limiting examples are presented: In the tests which follow, a block styrene/butadiene copolymer sold under the trademark Finaprene® was used. The Finaprene® product tested was Finaprene® 411XP. Finaprene® 411XP is a styrene butadiene block copolymer having a radial structure which contains 31 percent by weight styrene and 69 percent by weight butadiene.

In formulating the composite hydraulic cements, the following general procedure was employed. Unless otherwise indicated, all amounts of composite other than cement are by weight of cement (bwoc).

The thermoplastic copolymer was dry blended with cement and other additives. The dry blend was then mixed with the necessary amount of water using standard API mixing procedure outlined in the reference—API Recommended Practice 10B, $22^{nd}$ Edition, December 1997: "Recommended Practice for Testing Well Cements," American Petroleum Institute. The prepared cement slurry is then poured into moulds and cured.

Tables 1–4 below show the data on mechanical properties such as compressive strength ($f_c$) flextural strength ($f_f$), tensile strength ($f_t$) and Young's modulis (E) for various formulations.

TABLE 1

| Slurry # | Finaprene 411 XP, % bwoc | Other % bwoc | Density (lbs/gal) | Cure Conditions | $f_f$ psi | $f_c$ psi | $f_t$ psi | E psi |
|---|---|---|---|---|---|---|---|---|
| 1 | — | — | 15.8 | 6 days | n.d | 4290 | 350 | 1.3e+6 |
| 2 | 2.5 | — | 15.6 | Same | 320 | 3290 | 320 | n.d |
| 3 | 5.0 | — | 15.35 | Same | n.d | 3020 | 370 | 5.6e+5 |
| 4 | 10 | — | 14.9 | Same | n.d | 2720 | 325 | 4.6e+5 |
| 5 | 12.5 | — | 14.8 | Same | n.d | 2360 | 315 | n.d |
| 6 | 12.5 | 0.5[1] | 14.51 | Same | n.d | 2560 | 290 | n.d |
| 7 | 20 | — | 14.26 | Same | n.d | 2120 | 260 | n.d |
| 8 | 20 | 0.5[2] | 14.17 | Same | n.d | 1930 | 280 | n.d |

[1] Polypropylene fibers ⅜" in length available from W. R. Grace.
[2] Polypropylene fibers ½" in length.

TABLE 2

Mechanical Properties at Ultimate Yield Point of set element of constant cement-to-water ratio (Water, 45% by weight of cement)

| Slurry # | Finaprene 411 XP, % bwoc[1] | Carbon Fibers % bwoc | Density (lbs/gal) | Curing Condition | Stress at Yield Point, psi | Area under curve for axial displacement at ultimate yield point | Area under curve for radial displacement at ultimate yield point | Poisson's ratio at yield point | E psi |
|---|---|---|---|---|---|---|---|---|---|
| 1 (Control) | — | — | 15.8 | 5 days @ 80° F. | 4340 | 20430 | 4440 | 0.196 | 1.3e+6 |
| 9 | 5 | — | 15.35 | Same | 2970 | 11110 | 3410 | 0.24 | 5.6e+5 |
| Comparative Values for Slurry #1 at 2970 psi | — | — | — | Same | 2970 | 4100 | 600 | 0.141 | 1.3e+6 |
| 10 | — | 5 | 15.35 | Same | 3660 | 7990 | 1690 | 0.17 | 9.6e+5 |
| Comparative Values for Slurry #1 at 3660 psi | — | — | — | Same | 3660 | 7650 | 1120 | 0.143 | 1.3e+6 |
| 11 | 5 | 5 | 15.0 | Same | 2850 | 10670 | 3280 | 0.254 | 5.2e+5 |
| Comparative Values for Slurry #1 at 2850 psi | — | — | — | | 2850 | 3600 | 520 | 0.140 | 1.3e+6 |
| 12 | 10 | — | 14.9 | Same | 2675 | 10900 | 3440 | 0.271 | 4.6e+5 |
| Comparative Values for Slurry #1 at 2850 psi | — | — | — | Same | 2675 | 3080 | 450 | 0.141 | 1.3e+6 |
| 13 | — | 10 | — | Same | 3700 | 13280 | 2490 | 0.165 | 6.8e+5 |
| Comparative Values for Slurry #1 at 3700 psi | — | — | — | Same | 3700 | 7790 | 1150 | 0.144 | 1.3e+6 |

[1] By weight of cement

TABLE 3

Mechanical properties of set cement at a constant density (14.8 pounds per gallon)

| Slurry # | Base Formulation | Finaprene 411XP, % bwoc | $f_c$ psi | $f_t$ psi | $f_t$ (Brazilian) | PR | E psi |
|---|---|---|---|---|---|---|---|
| 14 (Control) | Class G + 72% water + 35% silica flour | None | 1320 | | 98 | 0.114 | 4.6e+5 |
| 15 | Class G + 55% water + 35% silica flour | 15 | 1930 | | | 0.185 | 4.4e+5 |

TABLE 3-continued

Mechanical properties of set cement at a constant density
(14.8 pounds per gallon)

| Slurry # | Base Formulation | Finaprene 411XP, % bwoc | $f_c$ psi | $f_t$ psi | $f_t$ (Brazilian) | PR | E psi |
|---|---|---|---|---|---|---|---|
| 16 | Class G + 50% water + 35% silica flour | 20 | 1860 | 260 | 160 | 0.141 | 4.7e+5 |

TABLE 4

Mechanical Properties at Yield Point of set cement of constant density
(14.8 pounds per gallons)

| Slurry # | Finaprene 411XP, % bwoc | Stress at Yield Point, psi | Area under curve for axial displacement at yield point | Area under curve for radial displacement at yield point | Poisson's ratio at yield point | E psi |
|---|---|---|---|---|---|---|
| 14 (Control) | — | 1130 | 2400 | 790 | 0.244 | 3.3e+5 |
| 15 | 15 | 1924 | 5308 | 2143 | 0.287 | 4.4e+5 |
| 16 | 20 | 1705 | 3890 | 1050 | 0.216 | 4.7e+5 |

As can been seen from Tables 1–4, the cement formulations with toughness enhancing additive of the present invention show improved ductility, toughness and recoverable elongation without any significant decrease in compressive strength. In addition, the data shows that tensile strength increases when compared to a neat slurry of equivalent compressive strength.

As is well known to those skilled in the art, a variety of other additives are often and can be included in well cement compositions including the compositions of the present invention. For example, components such as set retarding additives, fluid loss control additives, viscosity reducers, corrosion inhibitors, etc. can be included. While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. A cement composition comprising:
   a hydraulic cement;
   sufficient water to form a slurry; and
   an effective amount of a resilience/toughness enhancing additive comprising a uniformly dispersed thermoplastic block copolymer.

2. The composition of claim 1, wherein the thermoplastic copolymer comprises a semicrystalline block and an elastomeric block.

3. The composition of claim 1, wherein the thermoplastic block copolymer comprises a styrene-butadiene copolymer.

4. The composition of claim 3, wherein styrene is present in the styrene-butadiene copolymer in an amount in the range of from about 25 to about 50 percent by weight, and wherein butadiene is present in the styrene-butadiene copolymer in an amount in the range of from about 75 to about 50 percent by weight.

5. The composition of claim 1, wherein the thermoplastic block copolymer comprises a glassy block and an elastomeric block.

6. The composition of claim 5, wherein the glassy block comprises polystyrene.

7. A cement composition comprising:
   a hydraulic cement;
   sufficient water to form a slurry; and
   an effective amount of a resilience/toughness enhancing additive comprising a uniformly dispersed thermoplastic block copolymer having a tensile strength of from about 500 to about 4000 psi, a recoverable elongation of about 200 to about 1000 percent and temperature stability in the range of about 30° to about 500° F.

8. The composition of claim 7, wherein the thermoplastic block copolymer comprises semicrystalline blocks and elastomeric blocks.

9. The composition of claim 7, wherein the thermoplastic block copolymer comprises a styrene-butadiene copolymer.

10. The composition of claim 7, wherein the thermoplastic block copolymer is radial.

11. The composition of claim 9, wherein styrene is present in the styrene-butadiene copolymer in an amount of about 25 to about 50 percent by weight and butadiene is present in the styrene-butadiene copolymer in an amount of from about 75 to about 50 percent by weight.

12. The composition of claim 7, wherein the thermoplastic block copolymer comprises glassy blocks and elastomeric blocks.

13. The composition of claim 12, wherein the glassy blocks comprise polystyrene.

14. A method of cementing in a subterranean formation comprising:
   placing a composition comprising a hydraulic cement and an effective amount of a generally uniformly dispersed resilience/toughness enhancing additive comprising a thermoplastic block copolymer in the subterranean formation; and
   permitting the composition to set therein;
   wherein the set composition comprises a hardened cement that comprises a generally uniform dispersion of the resilience/toughness enhancing additive.

15. The method of claim 14, wherein the thermoplastic block copolymer comprises semicrystalline blocks and elastomeric blocks.

16. The method of claim 14, wherein the thermoplastic block copolymer comprises a styrene-butadiene copolymer.

17. The method of claim 16, wherein styrene is present in the styrene-butadiene copolymer in an amount in the range of from about 25 to about 50 percent by weight, and wherein butadiene is present in the styrene-butadiene copolymer in an amount in the range of from about 75 to 50 percent by weight.

18. The method of claim 14, wherein the thermoplastic block copolymer comprises a glassy block and an elastomeric block.

19. The method of claim 18, wherein the glassy block comprises polystyrene.

20. A method of cementing in a subterranean formation comprising:

placing a composition comprising a hydraulic cement and an effective amount of a generally uniformly dispersed resilience/toughness enhancing additive comprising a thermoplastic block copolymer in the subterranean formation; and permitting the composition to set therein;

wherein the set composition comprises a hardened cement that comprises a generally uniform dispersion of the resilience/toughness enhancing additive; and wherein the thermoplastic block copolymer has a tensile strength of from about 500 to about 4000 psi, recoverable elongation of about 200 to about 1000 percent and exhibits temperature stability in the range of about 30° to about 500° F.

21. The method of claim 20, wherein the thermoplastic block copolymer comprises a semicrystalline block and an elastomeric block.

22. The method of claim 20, wherein the thermoplastic block copolymer comprises a styrene-butadiene copolymer.

23. The method of claim 22, wherein styrene is present in the styrene-butadiene copolymer in an amount of about 25 to 50 percent by weight and butadiene is present in the styrene-butadiene copolymer in an amount of from about 75 to 50 percent by weight.

24. The method of claim 20, wherein the thermoplastic block copolymer comprises a glassy block and an elastomeric block.

25. The method of claim 24, wherein the glassy block comprises polystyrene.

* * * * *